United States Patent
Robin et al.

(10) Patent No.: US 8,623,233 B2
(45) Date of Patent: Jan. 7, 2014

(54) AZEOTROPIC AND AZEOTROPE-LIKE COMPOSITIONS OF Z-1,1,1,4,4,4-HEXAFLUORO-2-BUTENE, TRANS-1,2-DICHLOROETHYLENE, AND 1,1,1,3,3-PENTAFLUOROBUTANE

(75) Inventors: Mark L. Robin, Middletown, DE (US); Joan Ellen Bartelt, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 2 days.

(21) Appl. No.: 13/519,004

(22) PCT Filed: Jan. 10, 2011

(86) PCT No.: PCT/US2011/020675
§ 371 (c)(1),
(2), (4) Date: Jun. 25, 2012

(87) PCT Pub. No.: WO2011/085309
PCT Pub. Date: Jul. 14, 2011

(65) Prior Publication Data
US 2013/0119292 A1    May 16, 2013

Related U.S. Application Data

(60) Provisional application No. 61/293,768, filed on Jan. 11, 2010.

(51) Int. Cl.
*A62D 1/00* (2006.01)
*C11D 17/00* (2006.01)
*C07C 19/08* (2006.01)
*C07C 23/00* (2006.01)

(52) U.S. Cl.
USPC ....... 252/2; 252/3; 252/67; 252/71; 252/78.1; 252/571; 252/182.12; 252/182.15; 252/364; 252/570; 510/408; 510/411; 510/415; 570/123; 570/153; 570/177; 570/175

(58) Field of Classification Search
USPC ............ 252/2, 3, 67, 71, 78.1, 571, 570, 364, 252/182.12, 182.15; 510/408, 411, 415; 507/123, 153, 175, 177
See application file for complete search history.

(56) References Cited

U.S. PATENT DOCUMENTS

| | | | |
|---|---|---|---|
| 7,972,524 B2* | 7/2011 | Robin | 252/2 |
| 7,972,525 B2* | 7/2011 | Robin | 252/2 |
| 8,262,924 B2* | 9/2012 | Robin | 252/2 |
| 2006/0242985 A1* | 11/2006 | Leck et al. | 62/323.1 |
| 2008/0269532 A1 | 10/2008 | Swearingen | |
| 2011/0218261 A1* | 9/2011 | Loh et al. | 521/117 |
| 2011/0219811 A1* | 9/2011 | Kontomaris | 62/476 |
| 2011/0226004 A1* | 9/2011 | Kontomaris | 62/476 |
| 2011/0240903 A1* | 10/2011 | Robin | 252/2 |

FOREIGN PATENT DOCUMENTS

| | | |
|---|---|---|
| WO | 2008134061 A2 | 11/2008 |
| WO | 2009032983 A1 | 3/2009 |
| WO | 2009085857 A2 | 7/2009 |
| WO | 2009114397 A2 | 9/2009 |

OTHER PUBLICATIONS

M. F. Doherty and M.F. Malone, Conceptual Design of Distillation Systems, McGraw-Hill (New York), 2001, 185-186, 351-359.

* cited by examiner

*Primary Examiner* — Joseph D Anthony

(57) ABSTRACT

Azeotropic or azeotrope-like compositions are disclosed. The azeotropic or azeotrope-like compositions are mixtures of Z-1,1,1,4,4,4-hexafluoro-2-butene, trans-1,2-dichloroethylene and 1,1,1,3,3-pentafluorobutane. Also disclosed is a process of preparing a thermoplastic or thermoset foam by using such azeotropic or azeotrope-like compositions as blowing agents. Also disclosed is a process of producing refrigeration by using such azeotropic or azeotrope-like compositions. Also disclosed is a process of using such azeotropic or azeotrope-like compositions as solvents. Also disclosed is a process of producing an aerosol product by using such azeotropic or azeotrope-like compositions. Also disclosed is a process of using such azeotropic or azeotrope-like compositions as heat transfer media. Also disclosed is a process of extinguishing or suppressing a fire by using such azeotropic or azeotrope-like compositions. Also disclosed is a process of using such azeotropic or azeotrope-like compositions as dielectrics.

6 Claims, No Drawings

AZEOTROPIC AND AZEOTROPE-LIKE COMPOSITIONS OF Z-1,1,1,4,4,4-HEXAFLUORO-2-BUTENE, TRANS-1,2-DICHLOROETHYLENE, AND 1,1,1,3,3-PENTAFLUOROBUTANE

The present application claims priority to U.S. Patent Application No. 61/293,768 filed on Jan. 11, 2010, incorporated herein by reference.

BACKGROUND OF THE INVENTION

1. Field of the Disclosure

The present disclosure relates to azeotropic or azeotrope-like compositions of Z-1,1,1,4,4,4-hexafluoro-2-butene, trans-1,2-dichloroethylene, and 1,1,1,3,3-pentafluorobutane.

2. Description of Related Art

Many industries have been working for the past few decades to find replacements for the ozone depleting chlorofluorocarbons (CFCs) and hydrochlorofluorocarbons (HCFCs). The CFCs and HCFCs have been employed in a wide range of applications, including their use as aerosol propellants, refrigerants, cleaning agents, expansion agents for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents. In the search for replacements for these versatile compounds, many industries have turned to the use of hydrofluorocarbons (HFCs).

The HFCs do not contribute to the destruction of stratospheric ozone, but are of concern due to their contribution to the "greenhouse effect", i.e., they contribute to global warming. As a result of their contribution to global warming, the HFCs have come under scrutiny, and their widespread use may also be limited in the future. Thus, there is a need for compositions that do not contribute to the destruction of stratospheric ozone and also have low global warming potentials (GWPs). Certain hydrofluoroolefins, such as 1,1,1,4,4,4-hexafluoro-2-butene ($CF_3CH=CHCF_3$, FO-1336mzz), are believed to meet both goals.

SUMMARY OF THE INVENTION

This disclosure provides an azeotropic or azeotrope-like composition consisting essentially of (a) Z-FO-1336mzz, (b) trans-1,2-dichloroethylene (E-ClCH=CHCl, trans-1,2-DCE) and (c) 1,1,1,3,3-pentafluorobutane ($CF_3CH_2CF_2CH_3$); wherein the trans-1,2-dichloroethylene and the 1,1,1,3,3-pentafluorobutane are present in effective amounts to form an azeotropic or azeotrope-like mixture with Z-FO-1336mzz.

This disclosure also provides processes of using these azeotropic or azeotrope-like compositions as blowing agents, refrigerants, solvents, aerosol propellants, heat transfer medias, fire extinguishants, fire suppression agents or dielectrics.

DETAILED DESCRIPTION OF THE INVENTION

In many applications, the use of a pure single component or an azeotropic or azeotrope-like mixture is desirable. For example, when a blowing agent composition (also known as foam expansion agents or foam expansion compositions) is not a pure single component or an azeotropic or azeotrope-like mixture, the composition may change during its application in the foam forming process. Such change in composition could detrimentally affect processing or cause poor performance in the application. Also, in refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure single component or an azeotropic or azeotrope-like composition, the refrigerant composition may change when leaked or discharged to the atmosphere from the refrigeration equipment. The change in refrigerant composition may cause the refrigerant to become flammable or to have poor refrigeration performance. Accordingly, there is a need for using azeotropic or azeotrope-like mixtures in these and other applications, for example azeotropic or azeotrope-like mixtures containing Z-1,1,1,4,4,4-hexafluoro-2-butene (Z-$CF_3CH=CHCF_3$, Z-FO-1336mzz, cis-FO-1336mzz).

Before addressing details of embodiments described below, some terms are defined or clarified.

FO-13360mzz may exist as one of two configurational isomers, E or Z. FO-13360mzz as used herein refers to the isomers Z-FO-13360mzz or E-FO-1336mzz, as well as any combinations or mixtures of such isomers.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article. OF apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

Z-FO-13360mzz is a known compound, and its preparation method has been disclosed, for example, in U.S. Patent Publication No. 2008/0269532, hereby incorporated by reference in its entirety.

This application includes ternary azeotropic or azeotrope-like compositions consisting essentially of (a) Z-FO-1336mzz, (b) trans-1,2-dichloroethylene, and (c) 1,1,1,3,3-pentafluorobutane; wherein the trans-1,2-dichloroethylene and the 1,1,1,3,3-pentafluorobutane are present in effective amounts to form an azeotropic or azeotrope-like mixture with Z-FO-1336mzz.

By effective amount is meant an amount, which, when combined with Z-FO-1336mzz, results in the formation of an azeotropic or azeotrope-like mixture. This definition includes the amounts of each component, which amounts may vary depending on the pressure applied to the composition so long as the azeotropic or azeotrope-like compositions continue to exist at the different pressures, but with possible different boiling points. Therefore, effective amount includes the amounts, such as may be expressed in weight or mole percentages, of each component of the compositions of the instant invention which form azeotropic or azeotrope-like compositions at temperatures or pressures other than as described herein.

As recognized in the art, an azeotropic composition is an admixture of two or more different components which, when in liquid form under a given pressure, will boil at a substantially constant temperature and provide a vapor composition essentially identical to the overall liquid composition undergoing boiling. (see, e.g., M. F. Doherty and M. F. Malone, Conceptual Design of Distillation Systems, McGraw-Hill (New York), 2001, 185-186, 351-359). Constant boiling compositions are characterized as azeotropic because they exhibit either a maximum or minimum boiling point of the mixture relative to the boiling points of the neat components at constant pressure, i.e., a maximum or minimum boiling point is observed in a plot of composition boiling point at a given pressure as a function of mole fraction of components in the composition. Azeotropic compositions are also characterized by a minimum or a maximum in the vapor pressure of the mixture relative to the vapor pressure of the neat components at a constant temperature, i.e., a maximum or minimum vapor pressure is observed in a plot of composition vapor pressure at a given temperature as a function of mole fraction of components in the composition.

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is also recognized in the art that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

For the purpose of this invention, an azeotrope-like composition means a composition that behaves like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

An azeotrope-like composition can also be characterized by the area that is adjacent to the maximum or minimum boiling point in a plot of composition boiling point at a given pressure as a function of mole fraction of components in the composition. Hence, another characteristic of an azeotrope-like composition is that there is a range of compositions containing the individual components in varying proportions over which the boiling point of the composition at a given pressure is substantially unchanged.

An azeotrope-like composition can also be characterized by the area that is adjacent to the maximum or minimum vapor pressure in a plot of composition vapor pressure at a given temperature as a function of mole fraction of components in the composition. Hence, another characteristic of an azeotrope-like composition is that there is a range of compositions containing the individual components in varying proportions over which the vapor pressure of the composition at a given temperature is substantially unchanged.

Additionally, azeotrope-like compositions exhibit dew point pressure and bubble point pressure with virtually no pressure differential. That is to say that the difference in the dew point pressure and bubble point pressure at a given temperature will be a small value. It was found through experiments that Z-FO-1336mzz, trans-1,2-dichloroethylene and 1,1,1,3,3-pentafluorobutane form ternary azeotropic or azeotrope-like compositions. The azeotropic composition consists essentially of about 71 weight percent of Z-1,1,1,4,4,4-hexafluoro-2-butene, about 27 weight percent of trans-1,2-dichloroethylene, and about 2 weight percent of 1,1,1,3,3-pentafluorobutane. It has the boiling point of about 30° C. at about atmospheric pressure (14.7 psia). The azeotrope-like composition consists essentially of from about 52 to about 72 weight percent of Z-1,1,1,4,4,4-hexafluoro-2-butene, from about 20 to about 28 weight percent of trans-1,2-dichloroethylene, and from greater than zero to about 27 weight percent of 1,1,1,3,3-pentafluorobutane. It has a boiling point of from about 30° C. to about 32° C. at a pressure of about 14.7 psia.

The azeotropic or azeotrope-like compositions of the present invention can be prepared by any convenient method including mixing or combining the desired amounts. In one embodiment of this invention, an azeotropic or azeotrope-like composition can be prepared by weighing the desired component amounts and thereafter combining them in an appropriate container.

The azeotropic or azeotrope-like compositions of the present invention can be used in a wide range of applications, including their use as aerosol propellants, refrigerants, solvents, cleaning agents, blowing agents (foam expansion agents) for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents.

One embodiment of this invention provides a process for preparing a thermoplastic or thermoset foam. The process comprises using an azeotropic or azeotrope-like composition as a blowing agent, wherein said azeotropic or azeotrope-like composition consists essentially of (a) Z-1,1,1,4,4,4-hexafluoro-2-butene, (b) trans-1,2-dichloroethylene, and (c) 1,1,1,3,3-pentafluorobutane, wherein the trans-1,2-dichloroethylene and the 1,1,1,3,3-pentafluorobutane are present in effective amounts to form an azeotropic or azeotrope-like combination with the Z-1,1,1,4,4,4-hexafluoro-2-butene.

Another embodiment of this invention provides a process for producing refrigeration. The process comprises condensing an azeotropic or azeotrope-like composition and thereafter evaporating said azeotropic or azeotrope-like composition in the vicinity of the body to be cooled, wherein said azeotropic or azeotrope-like composition consists essentially of (a) Z-1,1,1,4,4,4-hexafluoro-2-butene, (b) trans-1,2-dichloroethylene, and (c) 1,1,1,3,3-pentafluorobutane, wherein the trans-1,2-dichloroethylene and the 1,1,1,3,3-pentafluorobutane are present in effective amounts to form an azeotropic or azeotrope-like combination with the Z-1,1,1,4,4,4-hexafluoro-2-butene.

Another embodiment of this invention provides a process using an azeotropic or azeotrope-like composition as a solvent, wherein said azeotropic or azeotrope-like composition consists essentially of (a) Z-1,1,1,4,4,4-hexafluoro-2-butene, (b) trans-1,2-dichloroethylene, and (c) 1,1,1,3,3-pentafluorobutane, wherein the trans-1,2-dichloroethylene and the 1,1,1,3,3-pentafluorobutane are present in effective amounts to form an azeotropic or azeotrope-like combination with the Z-1,1,1,4,4,4-hexafluoro-2-butene.

Another embodiment of this invention provides a process for producing an aerosol product. The process comprises using an azeotropic or azeotrope-like composition as a propellant, wherein said azeotropic or azeotrope-like composition consists essentially of (a) Z-1,1,1,4,4,4-hexafluoro-2-butene, (b) trans-1,2-dichloroethylene, and (c) 1,1,1,3,-pentafluorobutane, wherein the trans-1,2-dichloroethylene and the 1,1,1,3,3-pentafluorobutane are present in effective amounts to form an azeotropic or azeotrope-like combination with the Z-1,1,1,4,4,4-hexafluoro-2-butene.

Another embodiment of this invention provides a process using an azeotropic or azeotrope-like composition as a heat transfer media, wherein said azeotropic or azeotrope-like composition consists essentially of (a) Z-1,1,1,4,4,4-hexafluoro-2-butene, (b) trans-1,2-dichloroethylene, and (c) 1,1,1,3,3-pentafluorobutane, wherein the trans-1,2-dichloroethylene and the 1,1,1,3,3-pentafluorobutane are present in effective amounts to form an azeotropic or azeotrope-like combination with the Z-1,1,1,4,4,4-hexafluoro-2-butene.

Another embodiment of this invention provides a process for extinguishing or suppressing a fire. The process comprises using an azeotropic or azeotrope-like composition as a fire extinguishing or suppression agent, wherein said azeotropic or azeotrope-like composition consists essentially of (a) Z-1,1,1,4,4,4-hexafluoro-2-butene, (b) trans-1,2-dichloroethylene, and (c) 1,1,1,3,3-pentafluorobutane, wherein the trans-1,2-dichloroethylene and the 1,1,1,3,3-pentafluorobutane are present in effective amounts to form an azeotropic or azeotrope-like combination with the Z-1,1,1,4,4,4-hexafluoro-2-butene.

Another embodiment of this invention provides a process using an azeotropic or azeotrope-like composition as dielectrics, wherein said azeotropic or azeotrope-like composition consists essentially of (a) Z-1,1,1,4,4,4-hexafluoro-2-butene, (b) trans-1,2-dichloroethylene, and (c) 1,1,1,3,3-pentafluorobutane, wherein the trans-1,2-dichloroethylene and the 1,1,1,3,3-pentafluorobutane are present in effective amounts to form an azeotropic or azeotrope-like combination with the Z-1,1,1,4,4,4-hexafluoro-2-butene.

Many aspects and embodiments have been described above and are merely exemplary and not limiting. After reading this specification, skilled artisans appreciate that other aspects and embodiments are possible without departing from the scope of the invention.

EXAMPLES

The concepts described herein will be further described in the following examples, which do not limit the scope of the invention described in the claims. Unless otherwise stated therein, all percentages are by weight.

Example 1

Example 1 demonstrates the existence of azeotropic or azeotrope-like compositions formed by Z-1,1,1,4,4,4-hexafluoro-2-butene, trans-1,2-dichloroethylene and 1,1,1,3,3-pentafluorobutane. An ebulliometer equipped with a thermometer was charged with 20.0 grams of a mixture (72.1 wt % Z-1,1,1,4,4,4-hexafluoro-2-butene and 27.9 wt % trans-1,2-dichloroethylene) and then 1,1,1,3,3-pentafluorobutane was added in measured increments. The boiling point temperatures of the resultant ternary mixtures at about 14.7 psia were measured and recorded (see Table 1). Temperature depression was observed when 1,1,1,3,3-pentafluorobutane was added to the Z-FO-1336mzz/trans-1,2-DCE mixture, indicating a ternary minimum boiling azeotrope was formed. At about atmospheric pressure (14.7 psia) the ternary azeotropic composition was found to have about 2 weight percent 1,1,1,3,3-pentafluorobutane, about 71 weight percent Z-FO-1336mzz and about 27 weight percent trans-1,2-DCE and have a boiling point of about 30° C. From greater than zero to about 27 weight percent 1,1,1,3,3-pentafluorobutane the boiling points of the resultant ternary mixtures changed by about 2° C. or less. These compositions hence exhibited azeotrope-like properties over this range.

TABLE 1

Boiling Points of Z-FO-1336mzz/trans-1,2-DCE/1,1,1,3,3-Pentafluorobutane Mixtures at 14.7 psia

| wt % 1,1,1,3,3-pentafluorobutane | wt % Z-FO-1336mzz | wt % trans-1,2-DCE | Temperature (° C.) |
| --- | --- | --- | --- |
| 0.00 | 72.00 | 28.00 | 30.6 |
| 1.85 | 70.66 | 27.48 | 30.3 |
| 3.64 | 69.38 | 26.98 | 30.4 |
| 5.37 | 68.14 | 26.50 | 30.6 |
| 7.03 | 66.94 | 26.03 | 30.8 |
| 8.63 | 65.78 | 25.58 | 30.8 |
| 10.19 | 64.67 | 25.15 | 30.9 |
| 11.68 | 63.59 | 24.73 | 31.1 |
| 13.13 | 62.54 | 24.32 | 31.2 |
| 15.90 | 60.56 | 23.55 | 31.4 |
| 17.21 | 59.61 | 23.18 | 31.6 |

What is claimed:

1. An azeotropic composition consisting essentially of:
   (a) Z-1,1,1,4,4,4-hexafluoro-2-butene;
   (b) trans-1,2-dichloroethylene; and
   (c) 1,1,1,3,3-pentafluorobutane; wherein the trans-1,2-dichloroethylene and the 1,1,1,3,3-pentafluorobutane are present in effective amounts to form an azeotropic combination with the Z-1,1,1,4,4,4-hexafluoro-2-butene.

2. The azeotropic composition of claim 1 which consists essentially of:
   (a) about 71 weight percent of Z-1,1,1,4,4,4-hexafluoro-2-butene;
   (b) about 27 weight percent of trans-1,2-dichloroethylene; and
   (c) about 2 weight percent of 1,1,1,3,3-pentafluorobutane.

3. The azeotropic composition of claim 2 having a boiling point of about 30° C. at a pressure of about 14.7 psia.

4. An azeotrope-like composition consisting essentially of:
   (a) Z-1,1,1,4,4,4-hexafluoro-2-butene;
   (b) trans-1,2-dichloroethylene; and
   (c) 1,1,1,3,3-pentafluorobutane; wherein the trans-1,2-dichloroethylene and the 1,1,1,3,3-pentafluorobutane are present in effective amounts to form an azeotrope-like combination with the Z-1,1,1,4,4,4-hexafluoro-2-butene.

5. The azeotrope-like composition of claim 4 which consists essentially of:

(a) from about 52 to about 72 weight percent of Z-1,1,1,4,4,4-hexafluoro-2-butene;
(b) from about 20 to about 28 weight percent of trans-1,2-dichloroethylene; and
(c) from greater than zero to about 27 weight percent of 1,1,1,3,3-pentafluorobutane.

6. The azeotrope-like composition of claim 5 having a boiling point of from about 30° C. to about 32° C. at a pressure of about 14.7 psia.

* * * * *